Figure 1:
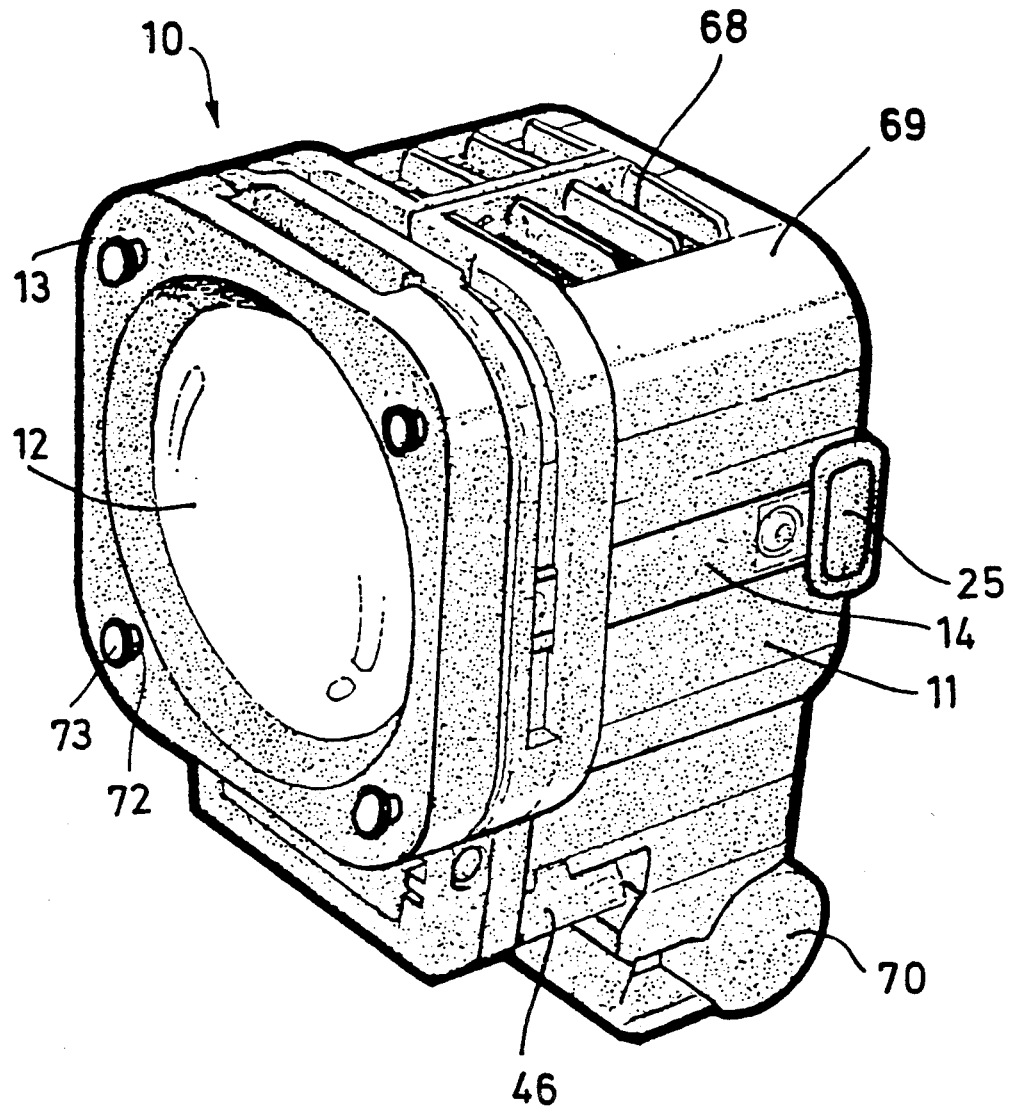

United States Patent

Hahnel

[11] Patent Number: 5,083,253
[45] Date of Patent: Jan. 21, 1992

[54] LIGHTING UNIT

[76] Inventor: Walter Hahnel, Bandon, County Cork, Ireland

[21] Appl. No.: 439,401
[22] PCT Filed: Jan. 13, 1989
[86] PCT No.: PCT/EP89/00030
  § 371 Date: Nov. 3, 1989
  § 102(e) Date: Nov. 3, 1989
[87] PCT Pub. No.: WO89/06770
  PCT Pub. Date: Jul. 27, 1989

[30] Foreign Application Priority Data

Jan. 14, 1988 [IE] Ireland .................... 102/88

[51] Int. Cl.⁵ .................................. F21V 7/00
[52] U.S. Cl. ........................ 362/306; 362/373;
      362/374; 362/294; 362/280; 362/455
[58] Field of Search ............. 362/373, 294, 374, 375,
      362/280, 306, 346, 349, 299, 300, 280, 277, 372, 455

[56] References Cited

U.S. PATENT DOCUMENTS

| 2,076,240 | 4/1937 | Levy . | |
| 2,287,328 | 6/1942 | Rose | 362/373 |
| 3,020,390 | 2/1962 | Lusk . | |
| 3,459,934 | 8/1969 | Moore | 362/294 |
| 3,831,021 | 8/1974 | Muhlogger | 362/294 |
| 4,546,420 | 10/1985 | Wheeler et al. | 362/373 |
| 4,692,844 | 9/1927 | Galerne | 362/372 |
| 4,695,930 | 9/1987 | Wierzbicki et al. | 362/294 |
| 4,800,475 | 10/1198 | Pandgiotou | 362/373 |
| 4,839,783 | 6/1989 | Ardi | 362/374 |

FOREIGN PATENT DOCUMENTS

| 611621 | 10/1926 | France | 362/280 |
| 1197928 | 7/1970 | United Kingdom | 362/373 |

Primary Examiner—Ira S. Lazarus
Assistant Examiner—D. M. Cox
Attorney, Agent, or Firm—Klauber & Jackson

[57] ABSTRACT

The lighting unit (10) is designed for use with video cameras. The lighting unit is light in weight, compact in size and portable. There is a housing (11) including a reflector (30) and a light source (33). A focussing lens (12) is moveably mounted on the housing (11) forwardly of the light source (33). The light source is moveable between two final positions to provide either floodlight or spotlight. This enables the photo amateur to obtain illumination as a professional at affordable costs.

13 Claims, 6 Drawing Sheets

LIGHTING UNIT

The present invention relates to improvements in lighting units and in particular to lighting units of the type used with video cameras.

Lighting units for use with video recorders are known, however, such prior art lighting units have a number of problems. First, in the known type of lighting units the light source is movable relative to a focussing lens to provide a light beam of either spotlight or floodlight quality. This construction of light has the disadvantage that it requires a two or three lens system to provide the necessary floodlight/spotlight characteristic light beams. In addition, this known light unit is complicated in construction.

A further disadvantage of the prior art lighting units is that they generally use either a parabolic or an elliptical type of reflector. The parabolic type reflector has the disadvantage that the light beam cannot be fully controlled by the lens system and hot spots in the central area of the light beam often require a diffuser to evenly distribute the light beam. The elliptical type reflector has the disadvantage that direct light emission from the filament of the bulb is reduced and inefficient because the bulb is positioned horizontally and with the glass tip facing forwardly thus interfering with direct light flow from the filament. Further, because of the proximity of the lamp filament to the rear of the reflector, and since the light bulb must be inserted through an aperture in the rear of the reflector, this results in considerable loss of reflective area and thus efficiency.

Accordingly, it is an object of the present invention to provide a lighting unit which is portable and which also may be easily attached to a video camera. This requires a lighting unit which is light in weight and compact in size. As a matter of fact, the lighting unit should provide floodlight and spotlight with high efficiency and high optical qualities.

According to the invention, the solution to this objective is provided by a lighting unit comprising a housing including a reflector mounted within the housing, a removable light source fixed within the housing and disposed within the region of the reflector, and a focusing lens movably mounted on the housing forwardly of the light source, the lens at least movable between positions to provide floodlight and spotlight light beams. In a preferred embodiment according to the invention, the reflector includes a part-spherical member and is disposed slightly rearwardly of the light source. A major advantage of the invention is that it provides an extremely compact lighting unit with good beam control and good efficiency due to the reflector having a part-spherical component. The compactness of such a lighting unit is a major advance with potential wide usage. The lighting unit is portable, compact and readily attachable to a video camera.

Further advantageous embodiments of the invention form the subject matter of several subclaims.

Figure 2:
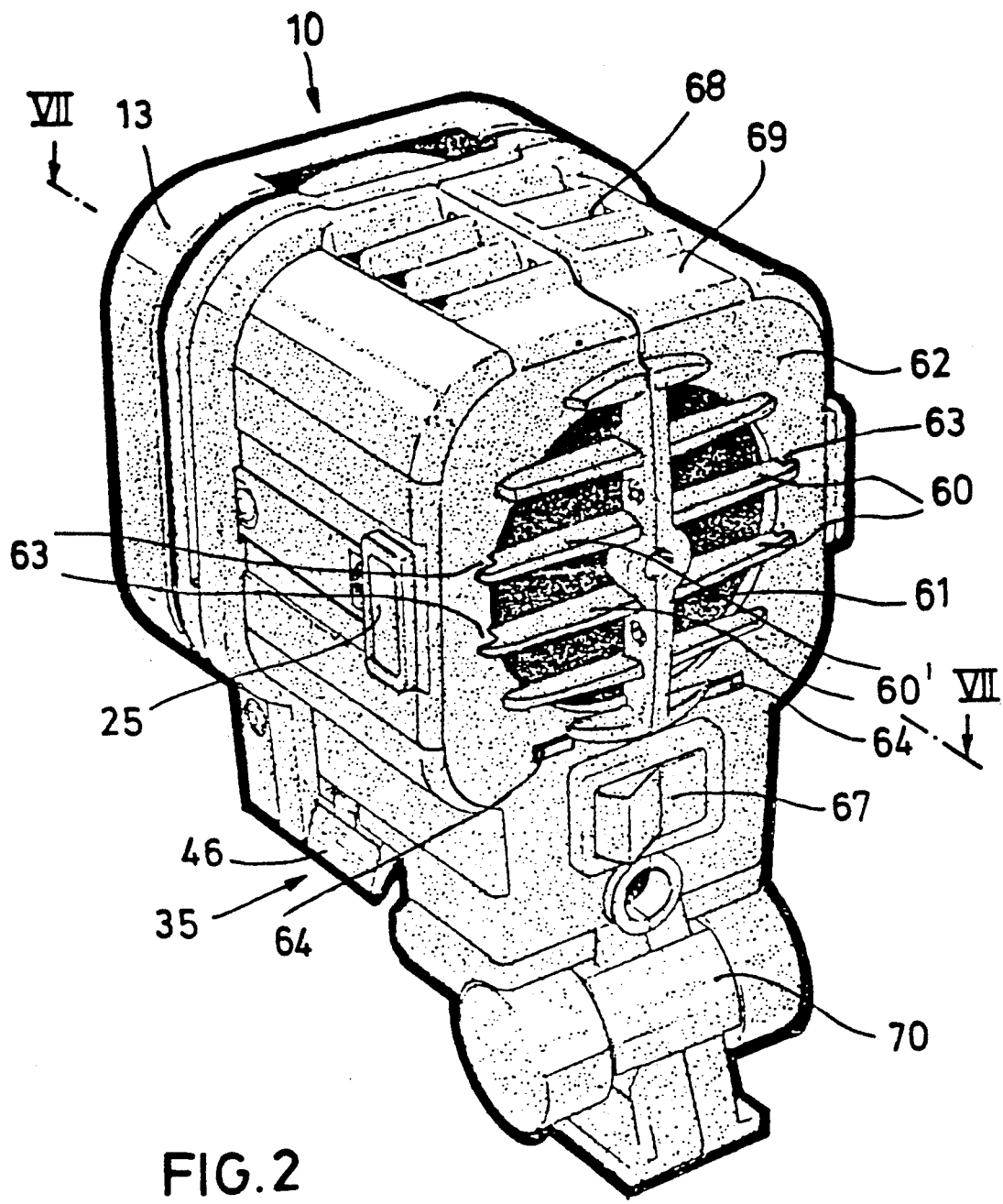
Figure 3:
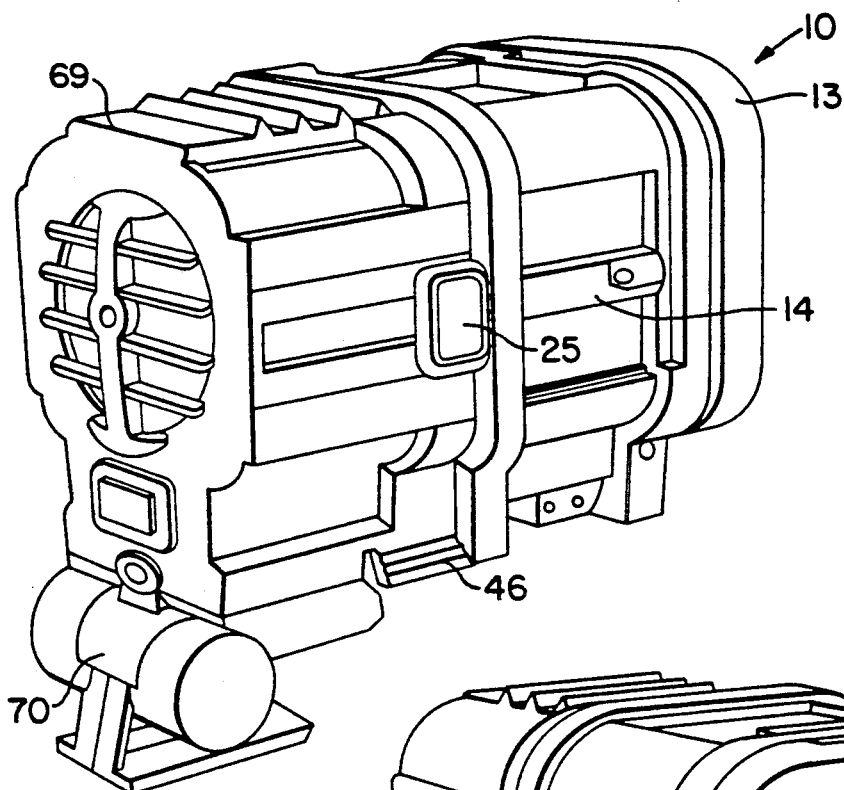
Figure 4:
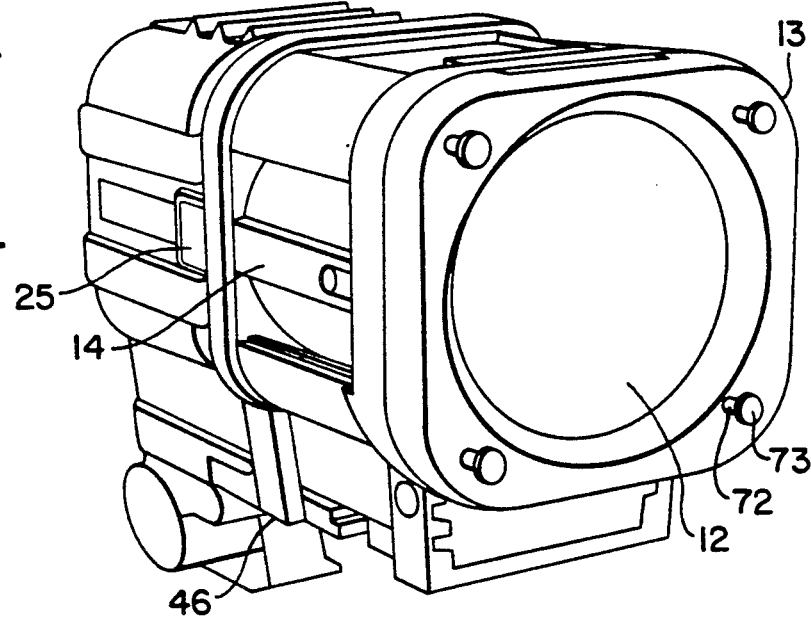
Figure 5:
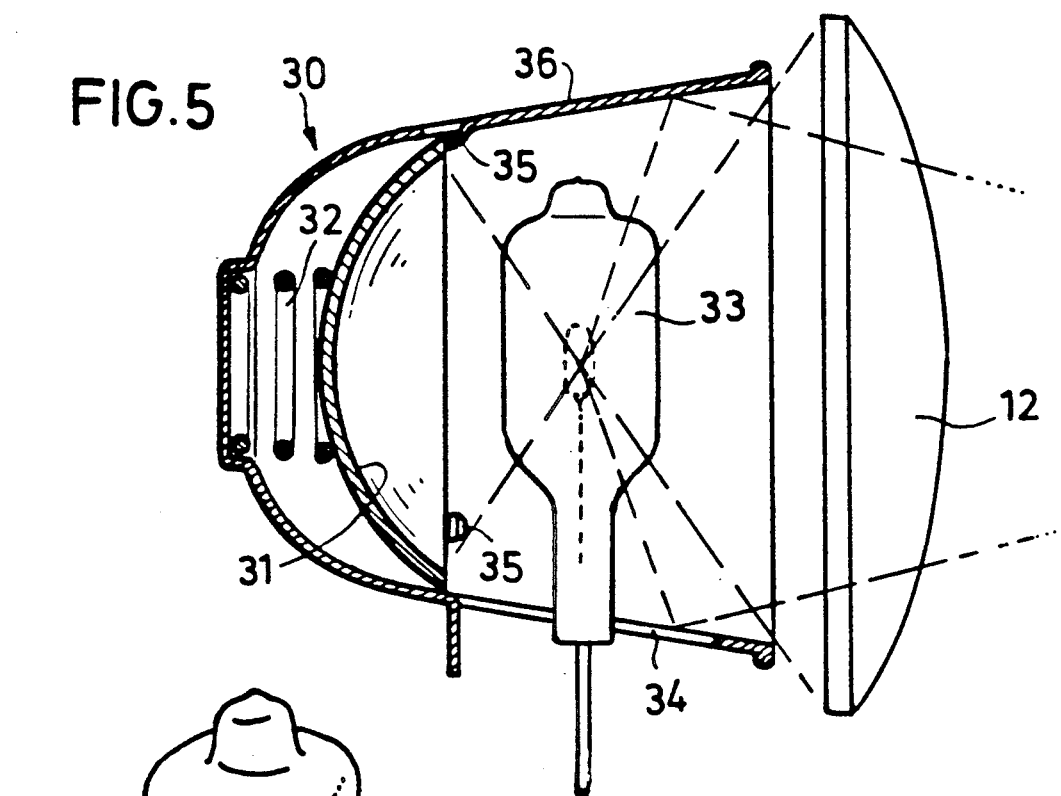
Figure 6:
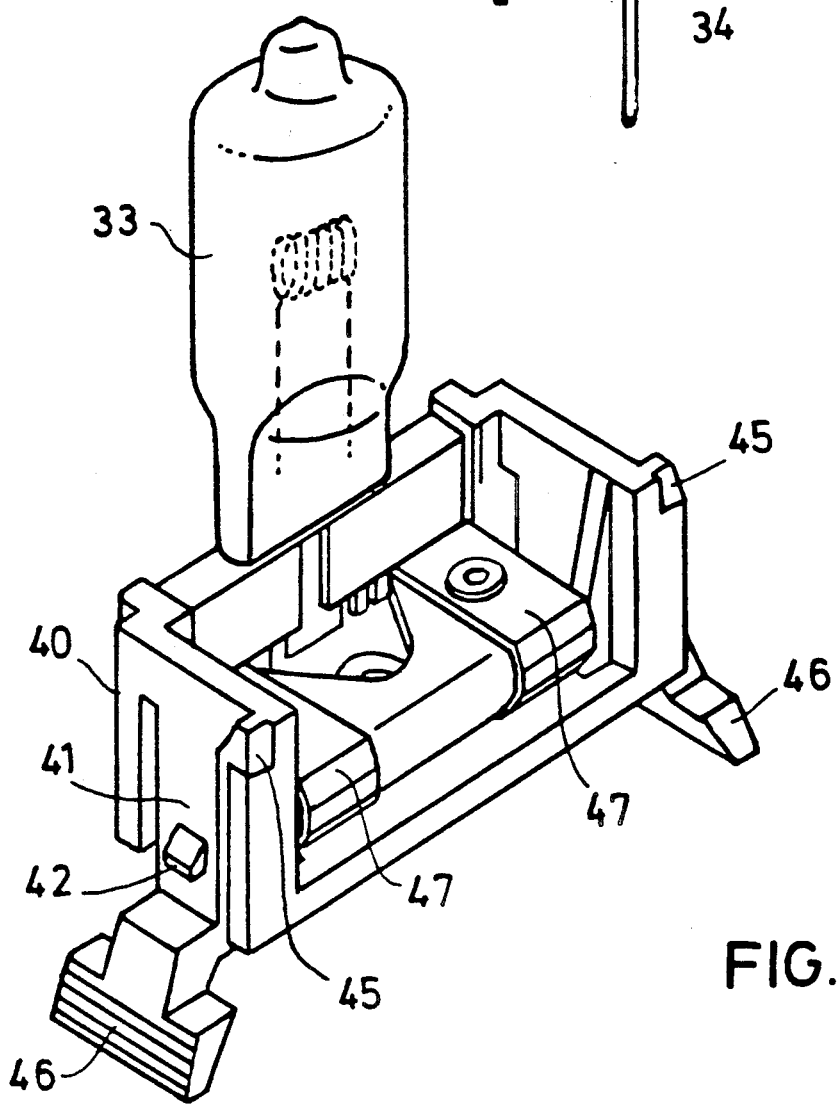
Figure 7:
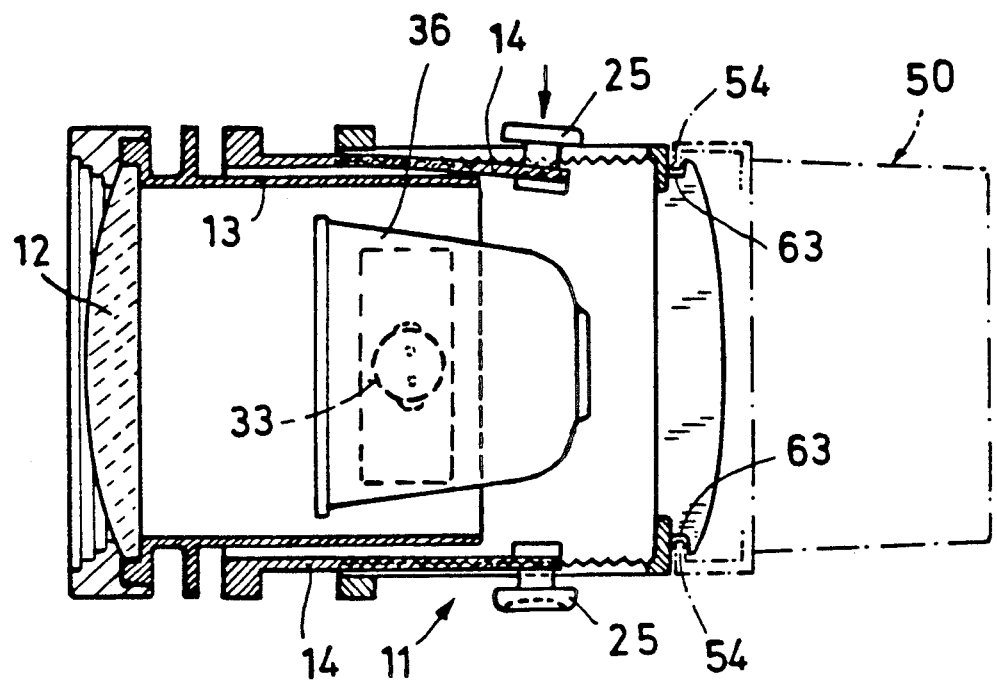
Figure 8:
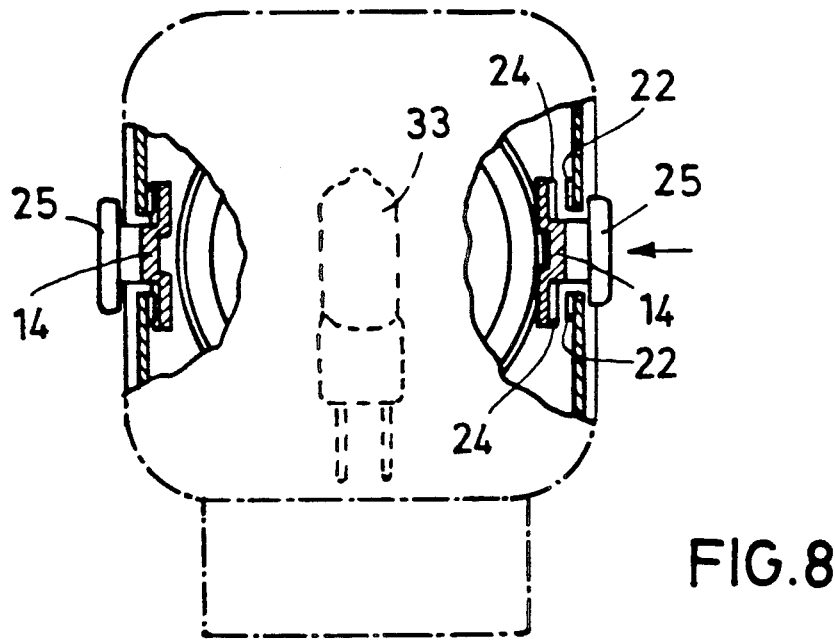
Figure 9:
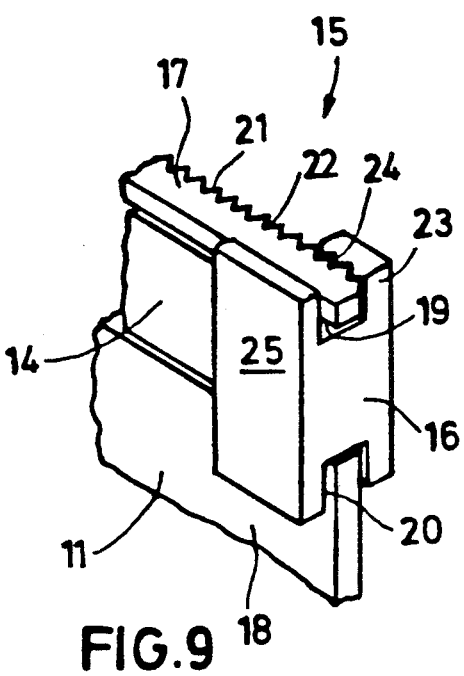
Figure 10:
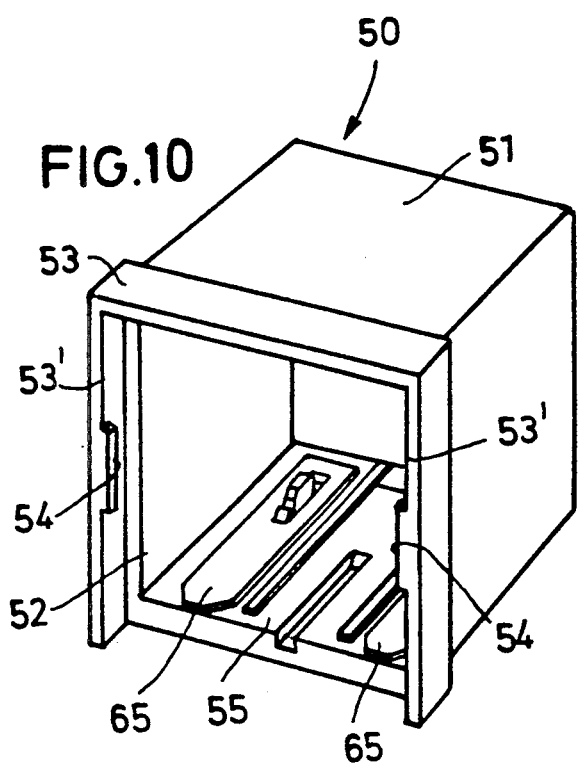
Figure 11:
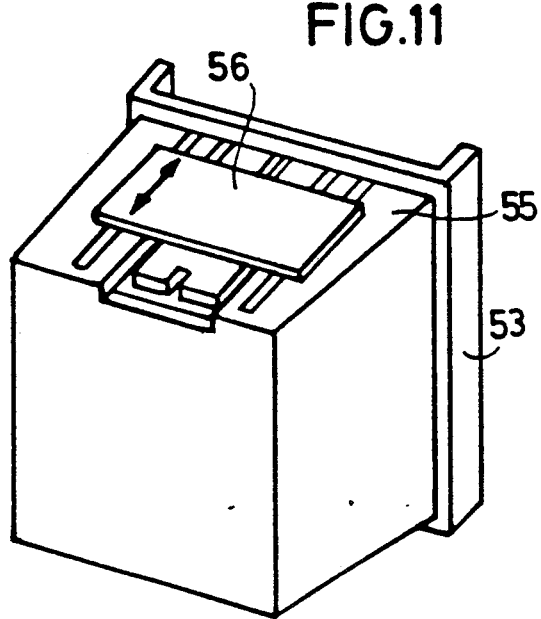

An embodiment of the invention will now be described by way of example with reference to the accompanying drawings in which:

FIG. 1 is a front perspective view of a lighting unit according to the invention, FIG. 2 is a rear perspective view of the lighting unit of FIG. 1, FIGS. 3 and 4 are front and rear perspective views of the lighting unit of FIG. 1 with the focussing lens in its forward position, FIG. 5 is a diagrammatic sectional view of the reflector, light source and focussing lens, FIG. 6 is a perspective view of the light source holder, FIG. 7 is a cross-sectional view taken along the line VII—VII in FIG. 2 of the sub-housing holding the focussing lens, FIG. 8 is a rear end view, partially in cross-section, of the sub-housing as shown in FIG. 7, FIG. 9 is a diagrammatic view of the locking means for the sub-housing, and FIGS. 10 and 11 are front and underneath perspective views of the fan unit.

Referring now to the drawings wherein similar numerals have been used to indicate like parts, there is shown therein a lighting unit generally indicated at 10 according to the invention. The lighting unit 10 comprises a housing 11 having a focussing lens 12 fixed in a sub-housing 13 which is movable forwardly and rearwardly between retracted and extended positions relative to the housing 11 as shown in FIGS. 1 to 4. The sub-housing 13 includes resilient arms 14 similar to leaf springs which slide in lateral recesses within the housing 11 and are fully contained therein in the retracted position. Further details shown in FIGS. 1 to 4 will be illustrated in a later part of this specification.

In FIG. 5 there is illustrated the construction of reflector 30 located within the housing 11. The reflector 30 comprises a part-spherical member 31 being disposed slightly rearwardly of the light bulb 33 forming the light source. The spherical member 31 comprises a light reflecting mirror-like material. It is urged forwardly by a compression spring 32 clamped between the rear end of the reflector 30 and the part-spherical member 31. The forward end of said part-spherical member 31 engages several lugs 35 projecting from a tube shaped member 36. This mode of mounting the part-spherical member 31 provides for centering same relative to the light bulb 33. This ensures that the reflected light from the part-spherical member 31 is emitted from a focus point which is in line or identical with the position of the bulb filament and thus the direct light from the part-spherical member 31 appears to emanate from a single coincident focus point. This arrangement is necessary to achieve beam control with a lens system.

The tube shaped member 36 in front of the reflector 30 and surrounding the light bulb 33 prevents scattering of light emanating therefrom. Thus, the combination of the part-spherical member 31 and the tube shaped member 36 provides the dual function of achieving a focussed light beam from the part-spherical member 31 and enables the capturing of more light than would be obtained purely by a spherical reflector from the light bulb 33, and maintaining a focussed beam. The focal length of the lens 12 is preferably in the range 85 mm to 90 mm and more preferably 86 mm. Further, the tube shaped member 36 has an aperture 34 on its lowermost side to enable the bulb 33 to be inserted into position from the underside of the housing 11.

As shown in FIG. 6 the light bulb 33 is mounted on a holder 40 which is inserted into the housing through a further aperture (not shown) in the housing 11 just below the aperture 34. This aperture in the housing 11 so corresponds with the aperture 34. The holder 40 and housing 11 have corresponding engaging means for locking the holder 40 in operative position. The holder 40 includes a pair of inherently resilient plastic arms 41 each of which carries a locking flange 42 which when the holder 40 is in place locates above a corresponding flange (not shown) in the housing 11. As shown, the flange 42 slopes downwardly and outwardly to enable the ready insertion of the holder 40 into the housing 11. As the holder is inserted the flanges 42 slide over the flanges (not shown) in the housing 11 causing the arms 41 to be pressed inwards against the inherent resilience of the arms 41. When the flanges 42 pass above the flanges in the housing 11, the arms 41 are again forced outwards to engage the flanges 42 above the flanges in the housing 11 to lock the holder 40 in place. The holder 40 further includes a pair of guide ribs 45 which locate in corresponding recesses (not shown) within the housing 11 to correctly locate the holder 40. Each of the arms 41 terminates at the lower end in a finger grip 46 which as shown in FIGS. 1 and 2 projects below the housing 11 when the holder 40 is in place. To remove the holder 40, for example when it is necessary to replace the bulb 33, it is a simple matter to press the finger grips 46 towards each other to release the flanges 42 from the housing 11 and the holder can then be readily removed. This mounting of the light bulb provides for a vertical position of same in front of the reflector 30. The glass accumulation at the top of the bulb 33 is always exterior to the light beam.

The holder 40 further includes a pair of spaced apart electrical contacts 47 which engage with corresponding electrical contacts (not shown) in the housing 11 to supply power to the bulb 33. The contacts 47 are preferably formed as leaf springs which are inherently urged upwards slightly. When the holder 40 is in place in the housing 11, the contacts 47 are pushed downwards slightly and form a secure electrical connection with the contacts in the housing.

FIGS. 7 and 8 show the sub-housing 13 holding the lens 12 being slidably mounted in the housing 11. Resilient arms 14 acting such as a leaf spring are connected to the sub-housing 13 and have finger grips 25 fastened to their free ends. Inward movement of the finger grips 25 as indicated by the arrows as shown on top of FIG. 7 and the right hand side of FIG. 8 provides for disengagement of teeth 22 and 24. Then, the sub-housing 13 is free to be moved inwardly and outwardly to provide floodlight or spotlight. FIG. 7 also shows the mounting of the fan unit 50 on the housing 11 by engagement of the protrusion 54 in the recesses 63.

As shown in FIG. 9, there is a locking means for the housing 11 generally indicated at !5 to enable the sub-housing 13 and the focussing lens 12 to be releasably locked in one or more selected positions relative to the housing 11. More specifically, FIG. 9 shows the situation at the bottom side of FIG. 7 or the left hand side of FIG. 8. As shown diagrammatically in FIG. 9, the resilient arm 14 terminates in a generally H shaped member 16, with upper and lower wall portions 17, 18 respectively of the housing 11 engaging in the upper and lower recesses 19, 20 of the H shaped member. The inside surface 21 of the upper wall portion 17 has a series of teeth 22 formed therein and the adjacent surface of the inner and uppermost arm 23 of the H shaped member has a series of corresponding teeth 24 formed therein. The resilient arm 14 acts to force the H shaped member outwards so that the teeth 24 engage with the teeth 22 of the upper wall portion 17, so that the housing 11 and sub-housing 13 are fixed relative to each other. The finger grip 25 is provided on the exterior surface of the H shaped member 16 to enable a user to push the H shaped member inwards against the spring bias provided by the resilient arm 14 to disengage the teeth 22, 24 and enable the sub-housing 13 and thus the lens 12 to be moved forwardly or rearwardly relative to the housing 11. Once the finger grip 15, actually on both sides, is released the resilient arm i4 acts to engage the teeth 22, 24 once again so that the lens 12 and housing 11 are fixed relative to each other. It will be appreciated that another finger grip is provided on the opposite side of the housing 11 to the finger grip 25 shown and that the housing 11 and the resilient arm 14 are constructed similarly but in the opposite sense to that shown in FIG. 9.

The invention further provides a detachable fan unit 50 as shown in FIGS. 10 and 11. A fan unit 50 is generally desirable to cool the lighting unit 10 if it is in use for long periods as the bulb 33 produces substantial heat. In FIGS. 10 and 11 only the fan housing 51 is shown and the actual fan and motor unit have not been shown. The housing 11 of the lighting unit has a series of ribs 60 located across an aperture 61 in the rear 62 of the housing, as shown in FIGS. 2 and 3, for example. The two centrally located ribs 60' each have a recess 63 formed at each end on which the fan housing 51 is located as described below. In addition, the rear 62 of the housing 11 has a pair of spaced apart apertures 64 into which electrical contacts 65 of the fan housing 51 are inserted to provide electrical power to the fan.

The fan housing 51 is open at its front end 52, and a peripheral flange 53 is provided around the front end 52. The vertical portions 53' of the flange 53 each has a protrusion 54 of a suitable shape as to be engaged in the recesses 63 at each end of the ribs 60' at the rear of the housing 11. The base 55 of the fan housing 51 further has a pair of electrical contacts 65 which are slidable forwardly and rearwardly, between a position as shown in FIG. 10 and a position in which the contact 65 forwardly of the fan housing 5!. The electrical contacts 65 are connected together by a sliding grip 56 mounted on the underside of the base 55. The motor (not shown) of the fan unit, when fixed within the fan housing 51 has electrical connections which are fixed to or are in contact with the contacts 65.

To locate the fan housing 51 on the housing 11, the fan housing is located above the rear 62 of the housing 11 and in contact with the rear 62, and then slid vertically downwards so that the protrusions 54 engage in the recesses 63 in the ribs 60'. The sliding grip 56 is then moved forwards so that the electrical contacts 65 are inserted into the apertures 64 in the rear 62 of the housing 11. Thus, the electrical contacts 65 when located in the apertures 64 also provide a mechanical lock for the fan housing 51, in addition to providing a means for conveying electrical power to the fan. Within the apertures 64 there are additional contacts (not shown) which are connected to electrical circuitry in the housing 11 for supplying power to the bulb 33 and fan unit. The electrical circuitry is controlled by means of an on/off switch 67 located on the rear 62 of the housing 11. When the fan unit 50 is energized, air is forced into the housing 11 through the aperture 61 and flows outwards through an aperture 68 in the top 69 of the housing 11. The power supply for the bulb 33 and fan unit 50 may be provided by a battery or provided from a mains adaptor. The light bulb 33 is operated at 12 volts and has a wattage of 30, 50, 75 or 100 watts respectively. When using a light bulb of 30 watts or a higher wattage bulb for a few minutes only the fan may remain inoperative. When using a light bulb of higher wattage or for longer periods of time the fan will be switched on.

The housing 11 further has a swivel mounting 70 to enable the unit to be moved in any desired direction.

Turning again to FIGS. 1 and 4, the front face of the subhousing 13 carries pins 72 with heads 73 at the ends thereof. They serve for the mounting and locking of filters, masks, and effect masks.

What is claimed:

1. A lighting unit comprising:
a housing;
a sub-housing slidably mounted in the housing;
a reflector mounted within the housing;
a removable light source fixed within the housing and disposed within the region of the reflector;
a focussing lens fixed in the sub-housing so as to be movably mounted on the housing forwardly of the light source, the lens at least being movable between positions to provide floodlight and spotlight beams;
resilient arms extending in the direction of relative movement between the sub-housing and the housing and being fastened to the sub-housing;
finger grips mounted on free ends of the resilient arms;
cooperating teeth provided on an inner side of said housing and on said resilient arms, respectively, for releasably securing said sub-housing to said housing at different positions.

2. A lighting unit according to claim 1, wherein the reflector includes a part-spherical member and is disposed slightly rearwardly of the light source.

3. A lighting unit according to claim 1, wherein the housing has an underside with an aperture for receiving a holder on which the light source is mounted.

4. A lighting unit according to claim 3, wherein the holder is removably engageable with the housing, the holder and the housing having corresponding engaging means for locking the holder in place.

5. A lighting unit according to claim 4, wherein the engaging means on the holder are fastened to resilient plastic arms and are resiliently urged into locking engagement with the engaging means in the housing.

6. A lighting unit according to claim 1, further including a detachable fan unit removably engageable on a rear portion of the housing.

7. A lighting unit according to claim 6, wherein the rear portion of said housing includes ribs with recesses at ends thereof, and the fan unit has a housing with cooperating engaging means in the form of protrusions.

8. A lighting unit according to claim 7, wherein the resilient arms comprise leaf springs and said housing includes slots which guidingly receive said resilient arms.

9. A lighting unit according to claim 8, wherein said leaf springs urge the teeth into engagement with each other.

10. A lighting unit according to claim 1, further including pins with heads at ends thereof provided on a front face of the sub-housing for mounting filters thereon.

11. A lighting unit according to claim 1, further including a tube-shaped member surrounding the light source in the housing.

12. A lighting unit according to claim 11, wherein the tube-shaped member includes an aperture in a lower side thereof to provide access for inserting a light bulb of said light source.

13. A lighting unit according to claim 11, wherein the reflector includes a part-spherical member and further including lugs inwardly projecting from the tube-shaped member, serving as stops for a front face of the part-spherical member, and a compression spring clamped between an inner side of the reflector and said part-spherical member.

* * * * *